US009948826B2

(12) United States Patent
Riedel et al.

(10) Patent No.: US 9,948,826 B2
(45) Date of Patent: *Apr. 17, 2018

(54) SYSTEM, METHOD AND COMPUTER PROGRAM PRODUCT FOR MULTI-TENANT FACSIMILE SERVER

(71) Applicant: Open Text SA ULC, Halifax (CA)

(72) Inventors: Michael Riedel, Tucson, AZ (US); Treber Rebert, Tucson, AZ (US)

(73) Assignee: Open Text SA ULC, Halifax, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/606,519

(22) Filed: Jan. 27, 2015

(65) Prior Publication Data

US 2015/0138601 A1 May 21, 2015

Related U.S. Application Data

(63) Continuation of application No. 13/315,978, filed on Dec. 9, 2011, now Pat. No. 8,970,880.

(Continued)

(51) Int. Cl.
*H04N 1/44* (2006.01)
*H04N 1/32* (2006.01)
*H04N 1/00* (2006.01)

(52) U.S. Cl.
CPC ....... *H04N 1/4406* (2013.01); *H04N 1/00228* (2013.01); *H04N 1/00244* (2013.01);
(Continued)

(58) Field of Classification Search
CPC ............. H04M 7/0003; H04M 7/0024; H04M 7/0027; H04N 1/32; H04N 1/324; H04N 2201/0087; G06F 3/12
(Continued)

(56) References Cited

U.S. PATENT DOCUMENTS 5,644,404 A 7/1997 Hashimoto et al.
5,754,640 A 5/1998 Sosnowski
(Continued)

FOREIGN PATENT DOCUMENTS

| JP | 2003319128 | 11/2003 |
|----|------------|---------|
| WO | WO0160050 | 8/2001 |
| WO | WO03061270 | 7/2003 |

OTHER PUBLICATIONS

Notice of Allowance issued for U.S. Appl. No. 14/556,958, dated Jul. 17, 2015, 6 pages.

(Continued)

*Primary Examiner* — Nicholas Pachol
(74) *Attorney, Agent, or Firm* — Sprinkle IP Law Group (57) ABSTRACT

In embodiments disclosed herein disclose methods and systems for providing a multitenant facsimile server. The computer instructions may be executable to maintain a set of entity information, wherein the entity information defines a plurality of tenants, and maintain a database configured to store transmitted and received fax documents corresponding to a plurality of tenants. The computer instructions may be further executable to receive a facsimile document at the fax server, wherein the facsimile document comprises one of a document to be transmitted or a received fax. The computer instructions may be further executable to identify a tenant associated with the document based on an identifier. Further, the computer instructions may be executable to store the document in the database, wherein the document is associated with the tenant in the database.

19 Claims, 5 Drawing Sheets

Related U.S. Application Data (60) Provisional application No. 61/421,850, filed on Dec. 10, 2010.

(52) U.S. Cl.
CPC ......... *H04N 1/324* (2013.01); *H04N 1/32101* (2013.01); *H04N 1/32363* (2013.01); *H04N 1/32416* (2013.01); *H04N 2201/3205* (2013.01); *H04N 2201/3208* (2013.01); *H04N 2201/3209* (2013.01); *H04N 2201/3288* (2013.01)

(58) Field of Classification Search
USPC .............................................. 358/1.15, 1.16
See application file for complete search history.

(56) References Cited

U.S. PATENT DOCUMENTS

| | | |
|---|---|---|
| 5,761,284 A | 6/1998 | Ranalli et al. |
| 5,862,202 A | 1/1999 | Bashoura et al. |
| 5,999,601 A | 12/1999 | Wells et al. |
| 6,020,980 A | 2/2000 | Freeman |
| 6,058,169 A | 5/2000 | Bramnick et al. |
| 6,259,538 B1 | 7/2001 | Amit |
| 6,301,611 B1 | 10/2001 | Matsumoto |
| 6,310,942 B1 | 10/2001 | Bashoura et al. |
| 6,512,593 B1 | 1/2003 | Yashiki |
| 6,539,077 B1 | 3/2003 | Ranalli et al. |
| 6,603,569 B1 | 8/2003 | Johnson |
| 6,618,165 B1 | 9/2003 | Sehgal |
| 6,825,947 B1 | 11/2004 | Asai |
| 6,922,255 B1 | 7/2005 | Tomida |
| 7,057,752 B1 | 6/2006 | Klotz, Jr. |
| 7,324,223 B1 | 1/2008 | Mori |
| 7,480,065 B1 | 1/2009 | Trandal et al. |
| 7,492,473 B2 | 2/2009 | Ferlitsch et al. |
| 7,653,185 B2 | 1/2010 | Rebert et al. |
| 8,249,228 B2 | 8/2012 | Street, Jr. |
| 8,279,465 B2 | 10/2012 | Couchman |
| 8,310,710 B2 | 11/2012 | Phillips et al. |
| 8,493,606 B2 | 7/2013 | Phillips et al. |
| 8,937,736 B2 | 1/2015 | Rebert et al. |
| 8,970,880 B2 | 3/2015 | Riedel et al. |
| 8,970,881 B1 | 3/2015 | Schwarz |
| 8,995,025 B2 | 3/2015 | Rebert |
| 9,544,469 B2 | 1/2017 | Rebert et al. |
| 9,596,381 B2 | 3/2017 | Rebert et al. |
| 9,699,127 B2 | 7/2017 | Lennstrom et al. |
| 9,912,833 | 3/2018 | Rebert |
| 2001/0005268 A1 | 6/2001 | Eguchi |
| 2001/0005864 A1 | 6/2001 | Mousseau |
| 2001/0027478 A1 | 10/2001 | Meier |
| 2001/0056538 A1* | 12/2001 | Amano .............. H04N 1/32101 713/185 |
| 2002/0018245 A1 | 2/2002 | Saito et al. |
| 2002/0021791 A1* | 2/2002 | Heilmann .............. H04L 63/105 379/189 |
| 2002/0026498 A1 | 2/2002 | Kim |
| 2002/0033961 A1 | 3/2002 | Murphy |
| 2002/0051146 A1 | 5/2002 | Tanimoto |
| 2002/0054371 A1 | 5/2002 | Tanimoto |
| 2002/0157028 A1 | 10/2002 | Koue et al. |
| 2003/0053444 A1 | 3/2003 | Swartz |
| 2003/0086124 A1 | 5/2003 | Parry |
| 2003/0142801 A1 | 7/2003 | Pecht |
| 2004/0136513 A1* | 7/2004 | Chiu .................... H04L 51/066 379/100.08 |
| 2005/0086240 A1* | 4/2005 | Richardson et al. ......... 707/100 |
| 2005/0094176 A1 | 5/2005 | Matsuishi |
| 2005/0108323 A1 | 5/2005 | Taylor |
| 2005/0162706 A1* | 7/2005 | Eguchi ............... H04N 1/00204 358/442 |
| 2005/0190402 A1 | 9/2005 | Nakamura |
| 2005/0270558 A1 | 12/2005 | Konsella et al. |
| 2005/0275871 A1* | 12/2005 | Baird et al. .................. 358/1.15 |
| 2006/0227367 A1 | 10/2006 | Kitada |
| 2007/0130271 A1 | 6/2007 | Ye et al. |
| 2007/0130365 A1 | 6/2007 | Rebert et al. |
| 2007/0146802 A1 | 6/2007 | Ushida |
| 2007/0150242 A1 | 6/2007 | Kitada |
| 2007/0168557 A1 | 7/2007 | Henry |
| 2007/0297002 A1* | 12/2007 | Hase ..................... G06F 21/608 358/1.15 |
| 2008/0019519 A1* | 1/2008 | Su ......................... H04N 1/4486 380/243 |
| 2008/0065477 A1* | 3/2008 | Korhonen ............... G06Q 30/02 705/14.49 |
| 2008/0155108 A1 | 6/2008 | Morris |
| 2008/0218809 A1 | 9/2008 | Chen et al. |
| 2008/0273220 A1 | 11/2008 | Couchman |
| 2009/0034015 A1* | 2/2009 | Mulligan .......... H04N 1/00832 358/408 |
| 2009/0067414 A1 | 3/2009 | Toscano et al. |
| 2009/0073499 A1 | 3/2009 | Glunz |
| 2009/0161168 A1* | 6/2009 | Miyamoto ......... H04N 1/32122 358/442 |
| 2009/0190159 A1 | 7/2009 | Toscano et al. |
| 2009/0222663 A1 | 9/2009 | Chow et al. |
| 2009/0316203 A1* | 12/2009 | Dukie ............... H04N 1/00209 358/1.15 |
| 2009/0323100 A1 | 12/2009 | Lee |
| 2010/0002260 A1 | 1/2010 | Naylor et al. |
| 2010/0007917 A1 | 1/2010 | Webster et al. |
| 2010/0039678 A1 | 2/2010 | Noel et al. |
| 2010/0067063 A1 | 3/2010 | Jang |
| 2010/0075673 A1 | 3/2010 | Colbert et al. |
| 2010/0085609 A1 | 4/2010 | Hong |
| 2010/0182651 A1 | 7/2010 | Rebert et al. |
| 2010/0208726 A1 | 8/2010 | Oliszewski et al. |
| 2010/0281016 A1 | 11/2010 | Weissman |
| 2010/0296121 A1 | 11/2010 | Shaheen, III et al. |
| 2011/0110366 A1 | 5/2011 | Moore et al. |
| 2011/0211218 A1 | 9/2011 | Gilmore |
| 2012/0143658 A1 | 6/2012 | Toscano |
| 2012/0257249 A1 | 10/2012 | Natarajan |
| 2012/0274988 A1 | 11/2012 | Bloomfield |
| 2012/0297471 A1 | 11/2012 | Smithson |
| 2013/0088741 A1 | 4/2013 | Murata et al. |
| 2013/0091042 A1 | 4/2013 | Shah et al. |
| 2013/0287189 A1 | 10/2013 | Cichielo et al. |
| 2013/0293933 A1 | 11/2013 | Rebert et al. |
| 2013/0346522 A1 | 12/2013 | Lennstrom et al. |
| 2014/0204411 A1 | 7/2014 | Riedel et al. |
| 2014/0307294 A1 | 10/2014 | Rebert |
| 2014/0340717 A1 | 11/2014 | Meiyappan |
| 2015/0085324 A1 | 3/2015 | Rebert |
| 2015/0146256 A1 | 5/2015 | Schwarz |
| 2015/0181075 A1 | 6/2015 | Rebert |
| 2015/0319338 A1 | 11/2015 | Rebert et al. |
| 2017/0070618 A1 | 3/2017 | Rebert et al. |
| 2017/0264580 A1 | 9/2017 | Lennstrom et al. |
| 2018/0020121 A1 | 1/2018 | Riedel et al. |

OTHER PUBLICATIONS

Office Action issued for U.S. Appl. No. 13/315,978, dated Dec. 16, 2013, 14 pages.

Schneider, "Introduction to Multi-Tenant Architecture," Feb. 11, 2009, [retrieved on Dec. 8, 2010, from <<http:www.developer.com/design/article.php/3801931>> 4 pages.

"Multi-tenant Architecture," © 2009-2010 Zscaler, Inc., [retrieved on Dec. 8, 2010, from <<http://www.zscaler.com/multi-tenant.html>>] 2 pages.

Chong et al., "Architecture Strategies for Catching the Long Tail," Microsoft Corporation, Apr. 2006, [retrieved on Dec. 8, 2010, from <<http://msdn.microsoft.com/en-us/library/aa479069(printer).aspx>>, 20 pages.

"Cloud-based Networking-Why Multi-tenancy Matters," White Paper, © 2010 Pareto Networks™, 14 pages.

Partial Search Report issued for European Patent Application No. 13 173 845.2, dated Nov. 14, 2013, 5 pages.

(56) References Cited

OTHER PUBLICATIONS

Extended Search Report issued for European Patent Application No. 13 173 845.2, dated Mar. 4, 2014, 9 pages.
International Search Report and Written Opinion issued for PCT Application No. PCT/EP2013/059026, completed on Jun. 21, 2013 dated Jul. 2, 2013, 10 pages.
Office Action issued in U.S. Appl. No. 13/485,140, dated Feb. 24, 2014, 14 pages.
Final Office Action issued for U.S. Appl. No. 13/485,140, dated Aug. 7, 2014, 18 pages.
International Preliminary Report on Patentability (IPRP) issued for PCT Application No. PCT/EP2013/059026, dated Nov. 13, 2014, 7 pages.
Office Action issued for U.S. Appl. No. 14/606,523, dated Mar. 11, 2015, 11 pages.
Office Action issued for U.S. Appl. No. 14/556,958, dated Mar. 30, 2015, 8 pages.
Office Action issued for U.S. Appl. No. 13/927,023, dated Apr. 7, 2015, 16 pages.
Office Action issued for U.S. Appl. No. 13/927,023, dated Sep. 23, 2015, 20 pages.
Office Action issued for U.S. Appl. No. 14/800,350, dated Sep. 10, 2015, 8 pages.
Office Action issued for U.S. Appl. No. 14/606,523, dated Oct. 19, 2015, 18 pages.
Notice of Allowance issued for U.S. Appl. No. 14/556,958, dated Dec. 11, 2015, 7 pages.
Notice of Allowance issued for U.S. Appl. No. 14/800,350, dated Jan. 11, 2016, 8 pages.
Office Action issued for U.S. Appl. No. 13/927,023, dated Feb. 9, 2016, 21 pages.
Office Action issued for U.S. Appl. No. 14/612,969, dated Feb. 29, 2016, 18 pages.
Notice of Allowance issued for U.S. Appl. No. 14/556,958, dated Mar. 24, 2016, 6 pages.
Notice of Allowance issued for U.S. Appl. No. 14/606,523, dated Apr. 8, 2016, 15 pages.
Notice of Allowance issued for U.S. Appl. No. 14/800,350, dated Apr. 22, 2016, 3 pages.
Notice of Allowance issued for U.S. Appl. No. 14/606,523, dated Jul. 15, 2016, 6 pages.
Office Action issued for U.S. Appl. No. 14/612,969, dated Aug. 2, 2016, 19 pages.
Notice of Allowance issued for U.S. Appl. No. 13/927,023, dated Aug. 10, 2016, 11 pages.
Notice of Allowance issued for U.S. Appl. No. 14/800,350, dated Aug. 10, 2016, 3 pages.
Corrected Notice of Allowance issued for U.S. Appl. No. 13/927,023, dated Aug. 24, 2016, 8 pages.
Notice of Allowance issued for U.S. Appl. No. 13/927,023, dated Nov. 8, 2016, 5 pages.
Notice of Allowance issued for U.S. Appl. No. 14/800,350, dated Nov. 7, 2016, 4 pages.
Notice of Allowance issued for U.S. Appl. No. 14/606,523, dated Nov. 16, 2016, 7 pages.
Office Action issued for U.S. Appl. No. 14/612,969, dated Feb. 7, 2017, 16 pages.
Office Action issued for U.S. Appl. No. 14/606,523, dated Feb. 28, 2017, 19 pages.
Office Action issued for U.S. Appl. No. 15/356,078, dated Feb. 24, 2017, 10 pages.
Notice of Allowance issued for U.S. Appl. No. 13/927,023, dated May 24, 2017, 7 pages.
Office Action issued for U.S. Appl. No. 14/612,969, dated May 30, 2017, 15 pages.
Office Action issued for U.S Appl. No. 14/606,523, dated Jun. 19, 2017, 25 pages.
Office Action issued for U.S. Appl. No. 15/356,078, dated Jun. 2, 2017, 6 pages.
Office Action issued for U.S. Appl. No. 15/609,843, dated Jul. 12, 2017, 25 pages.
Notice of Allowance issued for U.S. Appl. No. 14/612,969, dated Dec. 11, 2017, 8 pages.
Office Action issued for U.S. Appl. No. 14/606,523, dated Nov. 6, 2017, 34 pages.
Notice of Allowance issued for U.S. Appl. No. 14/612,969, dated Sep. 28, 2017, 6 pages.
Office Action issued for U.S. Appl. No. 15/356,078, dated Oct. 2, 2017, 6 pages.
Office Action issued for European Patent Application No. 13 173 845.2, dated May 31, 2017, 9 pages.
Notice of Allowance issued for U.S. Appl. No. 15/356,078, dated Feb. 14, 2018, 11 pages.
Office Action issued for U.S. Appl. No. 15/609,843, dated Jan. 9, 2018, 18 pages.

\* cited by examiner

SYSTEM, METHOD AND COMPUTER PROGRAM PRODUCT FOR MULTI-TENANT FACSIMILE SERVER

CROSS-REFERENCE TO RELATED APPLICATIONS

This patent application is a continuation of, and claims a benefit of priority under 35 U.S.C. § 120 from U.S. patent application Ser. No. 13/315,978, filed Dec. 9, 2011, entitled "SYSTEM, METHOD AND COMPUTER PROGRAM PRODUCT FOR MULTI-TENANT FACSIMILE SERVER," which claims the benefit of priority under 35 U.S.C. 119(e) of U.S. Provisional Patent Application Ser. No. 61/421,850, filed Dec. 10, 2010, entitled "SYSTEM, METHOD AND COMPUTER PROGRAM PRODUCT FOR MULTI-TENANT FACSIMILE SERVER," the entire contents of which are hereby expressly incorporated by reference for all purposes.

TECHNICAL FIELD

This application relates in general to methods and systems for serving facsimiles, and more particularly, to methods, systems, and computer program products implementing a multi-tenant architecture in a facsimile server.

BACKGROUND

Fax servers typically include a device equipped with one or more modems, fax boards, emulators for Fax over IP (e.g., T.38 emulators). Fax servers receive documents from users, convert the documents into faxes and transmit the documents as faxes. Fax servers can also receive faxes and store the incoming faxes in a repository or forward the faxes to users (e.g., via email or other messaging mechanism). In general, previous fax servers were single tenant fax servers serving a single client organization. In single tenancy architecture, vendors or servers typically provide a single physical infrastructure, database and application per customer.

SUMMARY

Example embodiments relate to systems, a computer program product with executable portions.

Embodiments disclosed herein provide methods and systems for providing a multitenant facsimile server. One embodiment can comprise a non-transitory computer readable medium storing a set of computer instructions. The computer instructions may be executable to maintain a set of entity information, wherein the entity information defines a plurality of tenants. The instructions may be further executable to maintain a database configured to store transmitted and received fax documents corresponding to a plurality of tenants. The computer instructions may be further executable to receive a facsimile document at the fax server, wherein the facsimile document comprises one of a document to be transmitted or a received fax. The computer instructions may additionally be executable to identify a tenant associated with the document based on an identifier. Further, the computer instructions may be executable to store the document in the database, wherein the document is associated with the tenant in the database.

In one embodiment, the facsimile document is a document received from a user to be transmitted. The computer instructions are further executable to perform the steps of identifying the user associated with the facsimile document, identifying the tenant associated with the user and applying one or more settings based on the tenant associated with the user when faxing the facsimile document.

According to one embodiment, each of the plurality of tenants has a corresponding fax number and the facsimile document has metadata containing the fax number. The tenant may be identified based on the fax number metadata. In another example embodiment, the identifier associated with each of the tenants is a domain name, with each tenant associated with a different domain name.

According to one embodiment, each of the tenants may be associated with a plurality of users and each of the tenants shares system resources of the facsimile server.

BRIEF DESCRIPTION OF THE DRAWINGS

The drawings accompanying and forming part of this specification are included to depict certain aspects of the invention. A clearer conception of the systems and methods will become more readily apparent by referring to the exemplary, and therefore non-limiting, embodiments illustrated in the drawings, wherein identical reference numerals designate the same components. The embodiments may be better understood by reference to one or more of these drawings in combination with the description presented herein. It should be noted that the features illustrated in the drawings are not necessarily drawn to scale.

DETAILED DESCRIPTION

The various features and advantageous details thereof of various embodiments are explained more fully with reference to the accompanying drawings and detailed in the following description. Descriptions of well known starting materials, processing techniques, components and equipment are omitted so as not to unnecessarily obscure the embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying embodiments will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Embodiments described herein provide a multi-tenant fax server. Within a multitenant architecture, a software application may be designed to virtually partition its data and configurations. Accordingly, a plurality of tenants may share or utilize a central resource, such as computing resources or an application, while retaining security control of data and settings between tenants.

Multitenancy may allow for multiple tenants to share or utilize networking resources or applications at a single fax server, thus reducing the need for redundant resources to serve multiple customers. By allowing a plurality of tenants to utilize or share the resources of the fax server, costs associating with operating a plurality of fax servers for each tenant may be reduced or limited.

Figure 1:
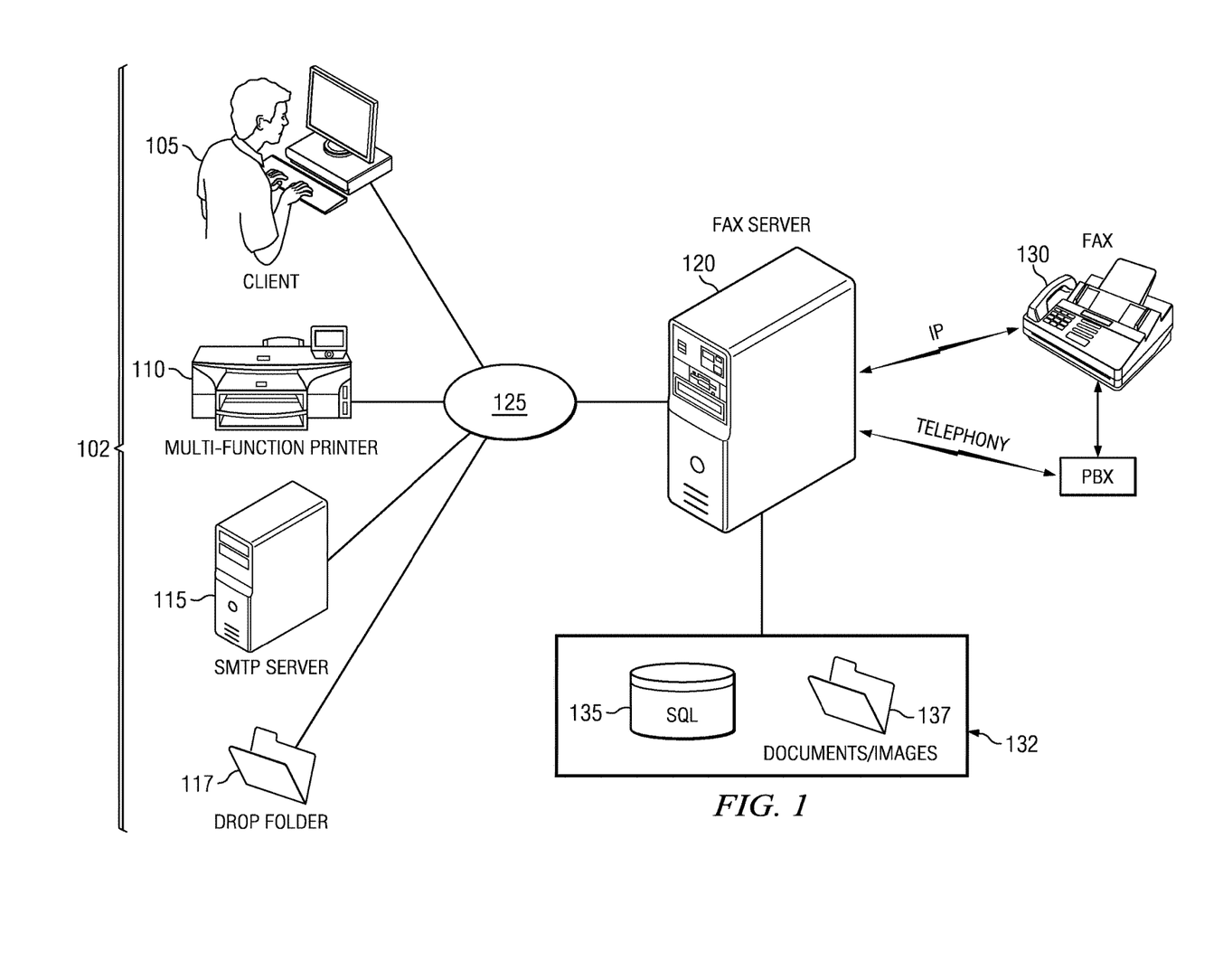
FIG. 1 depicts a diagrammatic representation of one embodiment of a system for sending/receiving faxes.

FIG. 1 is a diagrammatic representation of one embodiment of a system for sending/receiving faxes. In the embodiment of FIG. 1, a number of client devices 102, including, for example, client computers 105, multi-function printers (MFPs) 110, and servers (e.g., SNMP servers) 115 can communicate with a fax server 120 via a network 125. User's may also be able to submit documents using a drop folder service 117 hosted by fax server 120 or a third-party on-line storage service such as DropBox.com.

Fax server 120 can include fax boards or emulators to communicate with fax machine 130 via fax-over-IP or PBX or other facsimile transport technology. The fax server 120 may operate with a multitenant architecture and support a plurality of tenants, clients and/or devices. Fax server 120 may include a repository 135, such as a SQL database, and a file system 137 for storing images documents and/or mailboxes associated with each tenant.

Network 125 may be a LAN, WAN or other network. According to one embodiment, network 125 can include the Internet such that fax server 120 provides an Internet accessible service. Communication between server 120 and other devices may occur using cabled or wireless networking.

In operation, fax server 120 receives documents (a document may be used as a container for any type of digital content, including facsimiles, voice messages, videos, word processing documents, spreadsheets, and any other type of media including multimedia) from client devices 102 and routes or transports the documents to an appropriate destination, including converting the document to a facsimile document and sending the facsimile to a destination fax machine 130. Additionally, fax server 120 may receive facsimiles, convert the facsimiles into documents and forward the documents to client devices 102 or store the documents in a repository.

Figure 2:
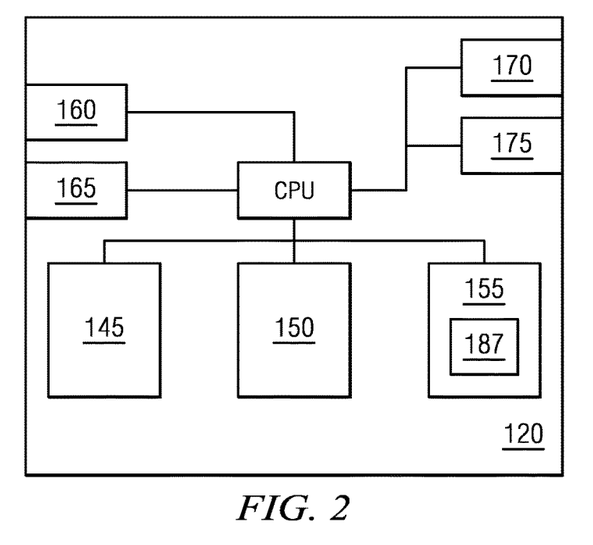
FIG. 2 depicts a diagrammatic representation of one embodiment of a fax server.

FIG. 2 depicts a diagrammatic representation of fax server 120. Fax server 120 can include a CPU 140, ROM 145, RAM 150, HD 155, I/O 160, network interface 165, fax boards 170, fax emulator 175 and/or other hardware. Fax server 120 may route documents using a variety of transport mechanisms including fax boards (e.g., by Eicon, Intel, Brooktrout or others), Board Server, Push Proxy Gateways, SMTP, MIME, T.37 or T.38 and other fax servers (e.g., such as a RightFax fax server by OpenText, Corporation).

Fax server 120 can store a fax server program 180 on a non-transitory storage medium (e.g., HD 155, RAM 150, optical disk, floppy disk, cartridge or other non-transitory storage medium). Fax server 120 can maintain a repository, including databases of information 135 internal or external to fax server 120 and a file system 137 for storing files. Files can be stored with related metadata including, but not limited to the user that submitted the document or to which the document is directed etc.

Figure 3:
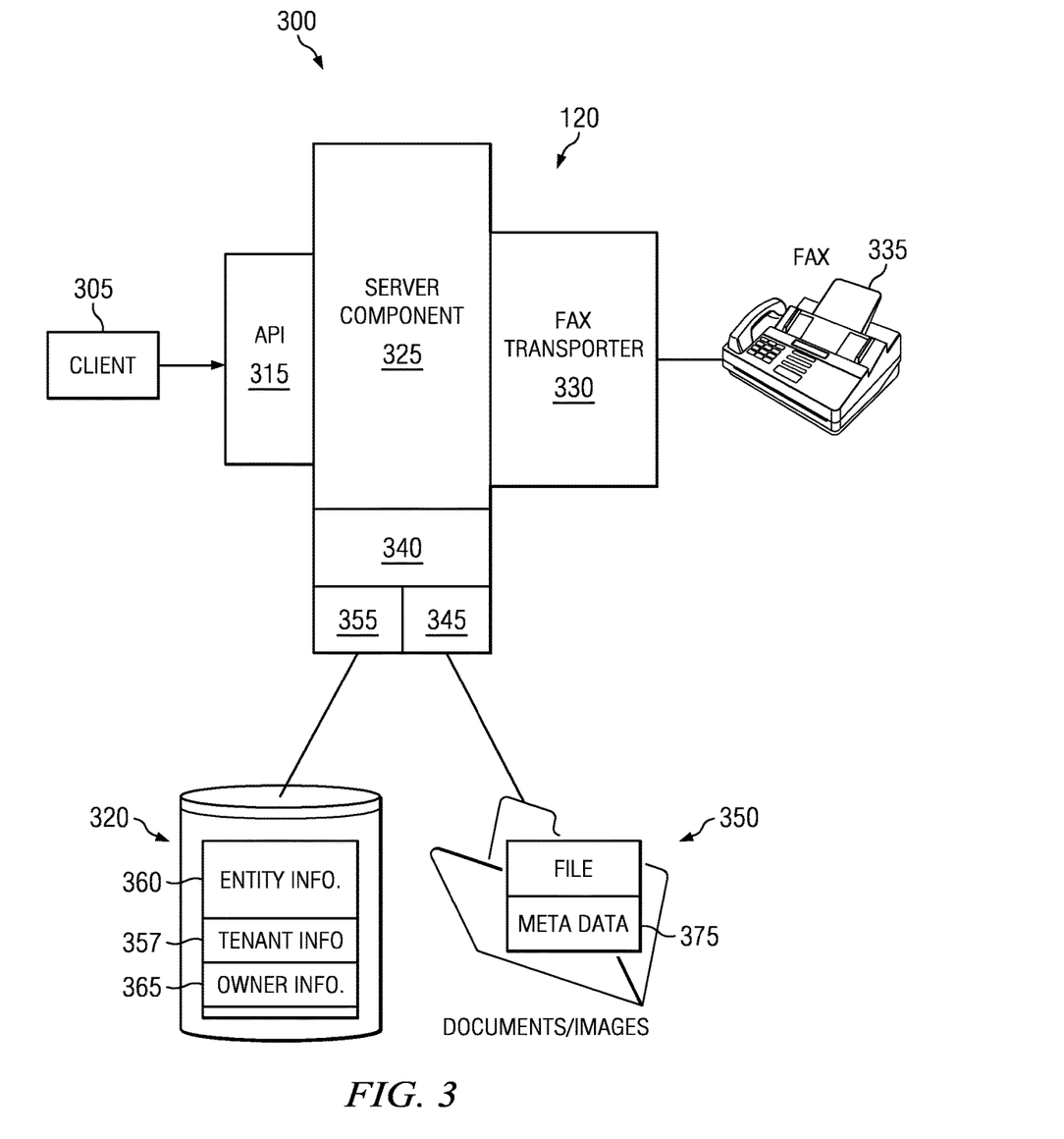
FIG. 3 depicts a diagrammatic representation of one embodiment of a system for processing documents.

FIG. 3 depicts one embodiment of a system 300 for processing documents. A client application or client device (represented at 305) can communicate with fax server 120 using API 315 or otherwise provide documents to fax server 120 (e.g., via email or other mechanism). A document received from client application or client device 305 can be stored in repository 320 by a server component 325 or other component.

The document can be forwarded to a fax board, emulator or other transport by the fax transport 330. According to one embodiment, fax transport 330 can be a universal document transport DocTrans module as described in U.S. patent application Ser. No. 12/634,267, which is hereby fully incorporated by reference herein. Fax transport 330 may communicate with hardware for sending and receiving faxes via, for example, cards or internet protocol address. According to one embodiment, documents communicated to the fax transporter 330 may be XML or TIFF.

As part of sending a document, fax transport 330 can apply dialing or routing rules to determine how fax server 120 is to transport or route a document. As an example, dialing or routing rules may indicate that a document that is sent at a specific time or is from a particular application is to be sent using a specific document transport. Example transports include fax boards (e.g., from Brooktrout, Eicon, Intel, etc.), SMS devices, routers for T.38 fax, email, T.37 fax, a DocPlus provider, virtual implementation of the above including document transmission simulations and so forth.

The fax transport 330 selects a target based on the applied dialing and routing rules. As example, fax transport 330 may select a public service telephone network ("PSTN"), another fax server, a board server containing one or more communications devices and so forth. As examples, the fax transport 330 may select a target based metadata, type of document or other attributes relating to the document.

In the opposite direction, fax transport 330 can receive faxes from the fax machine 335 and write each page to a file as each page is received from the fax machine 335. Once all the pages are received by the fax transport 330 from the fax machine 335 and written, the pages are read by the fax transport 330 and a multipage image is created by the fax transport 330. Fax transport 330 can forward the multipage image to server component 325, which can place the multipage image in repository 320. A client application or client device 305 may access the multi-page image through API 315, and the server component 325 may communicate the document to a client by email or any other mechanism.

Fax server 120 can further include a workflow engine 340 that manages the workflows of incoming and outgoing faxes and a file system API 345 to access the file system 350 for reading and writing files. Workflow engine 430 may also include a database API 355 for reading to and writing from repository 320.

According to one embodiment, fax server 120 may support a multi-tenant system in which client devices/applications/users associated with multiple tenants may send or receive documents through the same fax server. To support the multi-tenant architecture, repository 320 and file system 350 may be divided into multiple tenant repositories/file systems. This can be achieved according to any mechanism known or developed in the art. According to one embodiment, a single repository/file system is maintained and metadata is used to associate each document, record or other information with a particular defined tenant. In another embodiment, logically or physically separate databases and/or file systems may be used to store data for each tenant. Thus, documents in repository 320 or file system 350 can be associated with particular tenants. Fax server 120 can prevent access to documents associated with one tenant by users/devices associated with another tenant.

According to one embodiment, fax server 120 can store sets of entity information 360 defining various entities known to fax server 120, such a human users, devices, groups, tenants or other entities. Entity information 360 can include tenant information 357. Tenant information 357 can include, for example, a tenant ID, an associated customer name, settings for documents sent by the tenant (e.g., cover sheet settings, routing and dialing rules) and other settings. According to one embodiment, fax server 120 can allocate specific in-bound and out-bound facsimile numbers to each tenant. Thus, whenever a document is received by fax server 120 from a particular tenant for faxing, fax server 120 can route the document to an appropriate out bound fax line. Similarly, whenever a fax is received on a particular fax line (or directed to a particular fax number) fax server 120 can associate the received fax with the appropriate tenant.

Entity information 360 can further include owner information 365. Owner information 365 may include information associated with a person, device, application that may send documents to and receive documents from fax server 120. Each owner can be assigned or have associated with it various configuration setting including a fax number, password, identification or other information. Furthermore, each owner can be associated with a particular defined tenant.

Entity information 360 can include settings for configuration information, dialing rules, routing rules and other information that can be applied to any type of entity. If entities are organized in a hierarchical fashion, one entity may inherit settings from entities above it in the hierarchy (e.g., a user may inherit from a group and a group from a tenant). Configuration settings may include, for example, the type of cover sheet to apply to a fax, notification information, encryption settings. Routing and dialing rules specify parameters for routing a document to another fax server or transport (e.g., email) or for dialing and sending a facsimile. Thus, for example, a dialing or routing rule may specify that documents associated with a particular tenant must be sent on a predefined fax line(s) or from predefined number(s).

As another example, dialing or routing rules may indicate that a document that is to be sent at a specific time or is from a particular user is to be sent using a specific document transport. Dialing or routing rules can be applied based on information pertaining to the document, such as phone number, document transport, tenant, owner (e.g., user, device, application), etc.

As yet another example, fax server 120 can be configured such that a workflow engine processes a document differently depending on the owner, tenant or other entity. Fax server 120 may also limit access to documents based on the owner, tenant or other entity.

Files can be stored with related metadata 375 that may travel with the fax document. For example, the metadata may be related with an identifier of a sending and/or receiving devices, such as domain name, fax number, or any other identifier. The metadata 375, or other information, may be processed by the fax server 120 to identify the tenant or tenants associated with the communicated document so that the appropriate settings may be applied.

According to one embodiment, fax server 120 may maintain entity information as a hierarchy of entities in the fax server system. Each facsimile document processed by fax server 120 can be associated with one or more of the entities (e.g., through use of file metadata).

Figure 4:
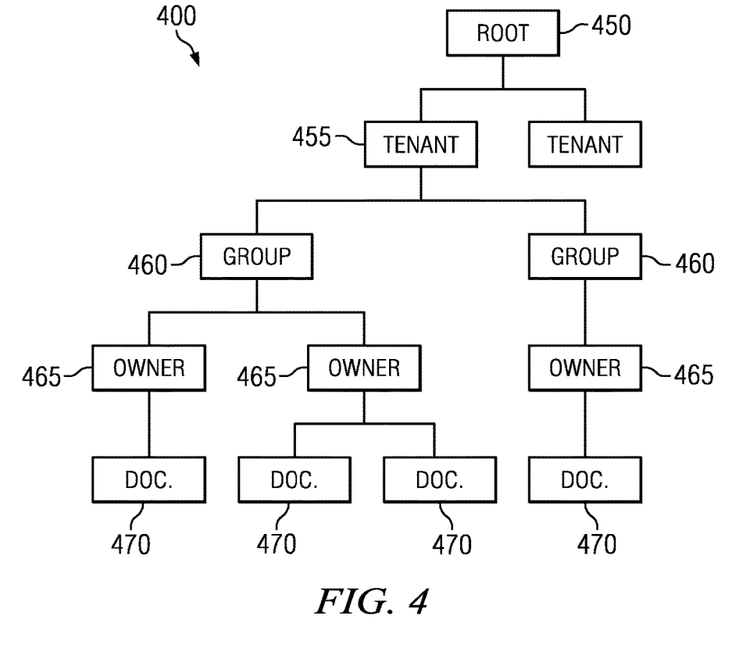
FIG. 4 depicts a diagrammatic representation of one embodiment of a hierarchy for a multi-tenant architecture utilizing a fax server.

FIG. 4 is a diagrammatic representation of one embodiment of a hierarchy for a multi-tenant architecture utilizing a fax server. The system defining the entities can be represented as root entity 450 with various entities defined below it. For example, hierarchy 400 can define tenants (entity 455), groups (entity 460), owners (entity 465), and documents (entity 470). As shown within the hierarchy 400, each tenant 455 may be associated with a plurality of groups 460 and/or owners 465. The hierarchy 400 can be maintained as an object model or according to any suitable programming means. According to one embodiment, various configuration settings can be set for each entity and entities can inherit attributes from entities above it in the hierarchy 400. For example, the system can set a default fax coversheet and notification language for a tenant 455. The default fax cover sheet can be inherited by owners 465 associated with that tenant. According to one embodiment, inherited settings can only be changed by owners if the owners are given permission to do so by an administrator.

The tenants 455 represent the entities for which fax server 120 is providing the fax server service. If a fax server is being used by multiple corporations, for example, each corporation may be considered a tenant. Information between different tenants may not be shared. The tenants 455 may be associated with a unique or distinctive identifier (as compared to other tenants), such as an internet protocol address, fax number(s), domain name(s), email domain name(s), or user identifications to allow documents received from destined for particular tenants to be identified.

Owners 465 are the entities that, from the perspective of fax server 120, are the recipients of or senders of facsimiles utilizing a client device, MFP, or any other device configurable to send or receive facsimiles. Accordingly, any number of types of owners 465 can be defined. According to one embodiment, the owner types can include human users (referred to as users), multi-function printers (MFP) and applications. Each of these owners can be considered to be on the same level of the hierarchy such that, for example, MFPs and applications are peers to users.

Figure 5:
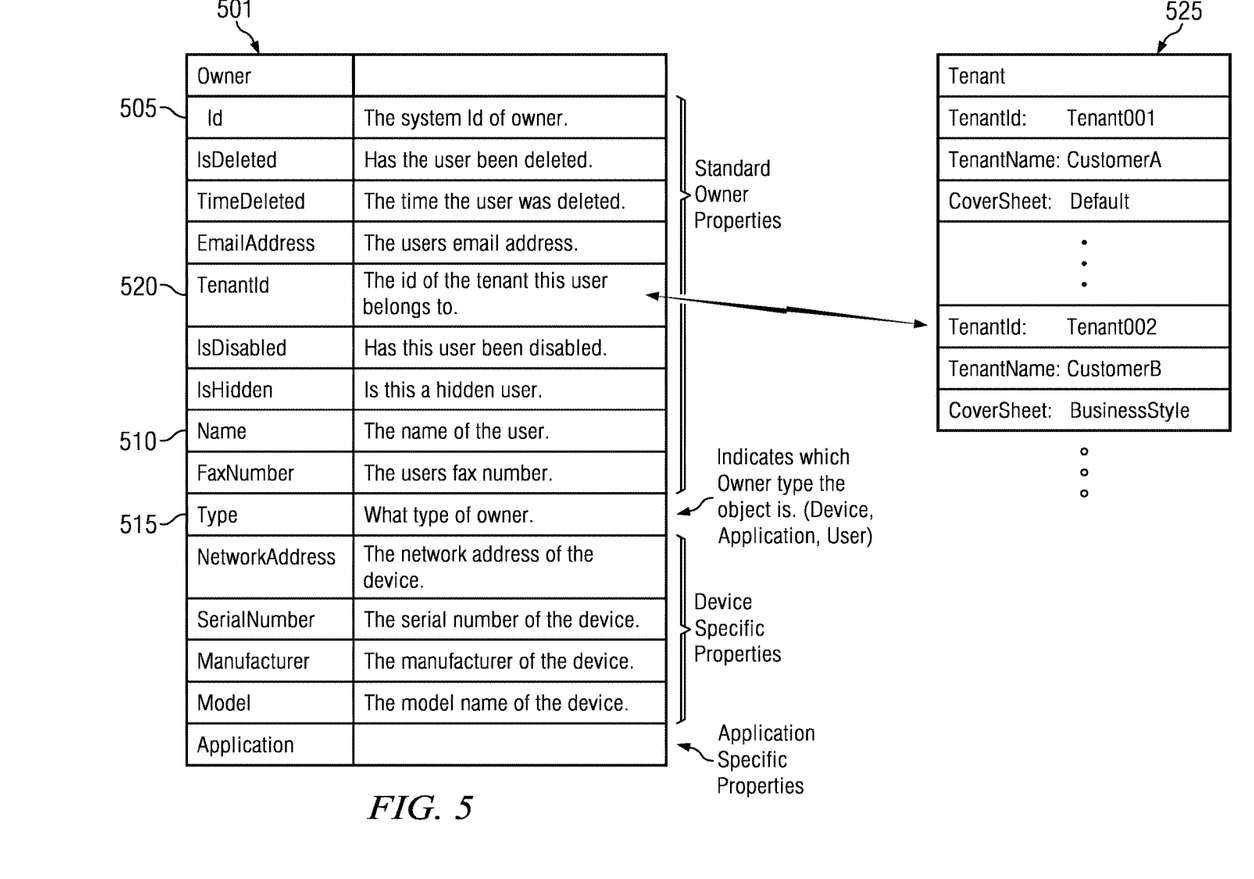
FIG. 5 depicts a diagrammatic representation of one embodiment of data structures for storing entity information.

According to one embodiment, information for entities can be stored in tables, such as database tables. FIG. 5 is a diagrammatic representation of one embodiment of data structures for storing entity information. Data structure 501 can establish information for users (e.g., human user, device or application). The data structure 501 can include a variety of fields, including an identification field 505 for the user.

Data structure 501 may also include a name field 510 in which the name of the user is specified (e.g., j.smith, MFP 1). The field 515 specifies whether the user is a human user, device or application. In the example of FIG. 5, the user table includes a field 520 referencing a particular tenant (by that tenant's identifier) to which the user is associated. Thus, each defined owner (or other entity) can be associated with an identified tenant.

Data structure 525 provides information for each tenant. Data structure 525 may store a name for each tenant, a unique identification for that tenant, a particular cover sheet applicable the tenant, etc. Other top level or tenant level information may also be stored in the tenant table. For example, the identification information such as a domain name, a fax number, or any other identifier may be associated with the tenant id.

When a document is received, the fax server can process information received with the document to identify the user, group, tenants or other entities associated with the document and apply configuration settings, routing and dialing rules or other settings accordingly. As an example, upon receiving a document from a particular user, the fax server may determine that the user is associated with Tenant 001. Based on the profile information for Tenant 001, the fax server can determine that it should send the document from a particular fax number and should apply a specified cover sheet style to the fax.

Figure 6:
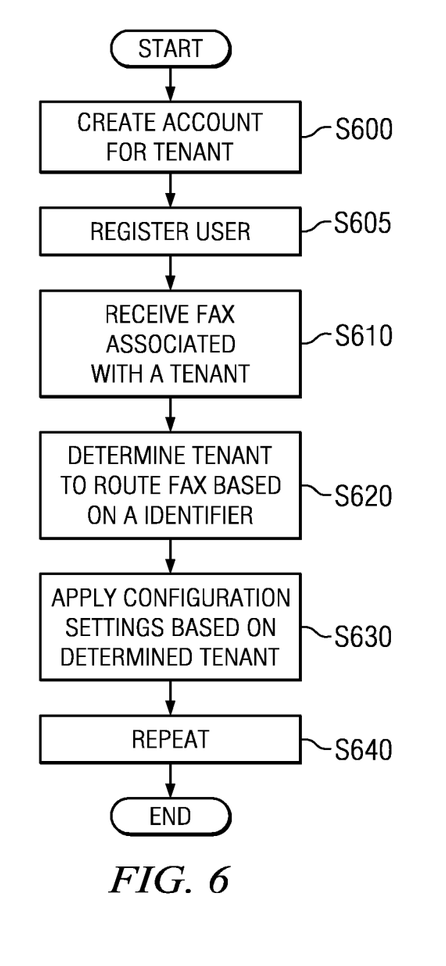
FIG. 6 depicts a flow diagram of a fax server utilizing a multitenant network.

FIG. 6 depicts a flow diagram of a fax server 120 utilizing a multitenant network. In S600, an account can be created for a tenant. The account information can include a tenant ID and settings for the tenant. According to one embodiment, information to identify documents received from that tenant may be provided. Such information may include a domain name, IP address or other information. Configurations of the account such as email, authentication, fax transport, notifications, cover sheet and other options may be configured for the tenant.

Upon a tenant registering for a fax server 120, the fax server 120 may assign the tenant a corresponding fax number and storage in the database. The database may be used as a mailbox to store received faxes and/or faxes waiting to be transmitted associated with the tenant. Further, the database may be allocated, partitioned, split or divided among a plurality of tenants in the multi-tenant architecture, or the database may be assigned to only the tenant.

At S605 a user may be registered with the fax server 120 and associated with the tenant. The profile of a user at the fax server 120 may include a variety of information. As one example, a profile for an MFP 110 may include settings for a coversheet. As another example, receipt notification settings can be configured. A receipt notification may request that a notification be send to an email address associated with the profile of the MFP 110, or printed on by the MFP 110. As another example, confirmation notification settings may be established for the user. A confirmation notification request may be an update corresponding to the status of the transmitted document. For example, the profile of a user may be configured to require an update of the transmitted document based on if the document was received, was not received, is waiting to be received by the fax server 120.

In S610, the fax server 120 may receive a fax corresponding with a tenant. The fax may include metadata corresponding to a sender and/or recipient of the fax document, such as a destination fax number or other identifier associated with a tenant.

In S620, the fax server may determine to which tenant to route the fax based on an identifier. More specifically, the fax server 120 may determine a corresponding entry for the tenant in a database based on the metadata associated with the received fax. For example, fax server 120 may determine that a fax is destined for Tenant 001 based on the fax number to which the fax was sent.

In S630, the fax server 120 may apply routing rules, mailbox rules, and/or configuration settings associated the determined tenant. For example, the fax server 120 may store the received fax in an inbox associated with the tenant.

According to one embodiment, each user associated with the tenant may view the database entry and the corresponding mailbox of the tenant at a fax server via an interface at a client device. However, because each document at the fax server supporting a multi-tenant architecture may correspond with a specific tenant, users may only view the received faxes corresponding to the tenant with which the user is associated. The fax server can enforce security rules to prevent users from accessing documents associated with other tenants.

In S640, the steps of FIG. 6 may be repeated as needed or desired, may be performed in other orders, or other steps performed.

Figure 7:
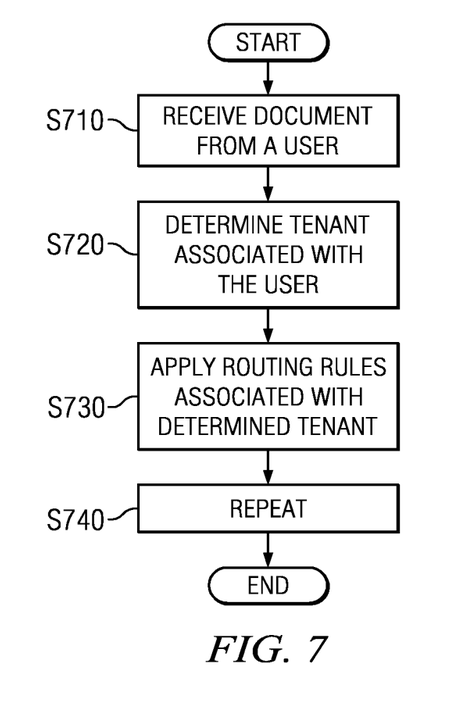
FIG. 7 is a flow diagram of a method for sending a document from a fax server providing a multi-tenant architecture

FIG. 7 is a flow chart illustrating one embodiment of a method for sending a document from a fax server providing a multi-tenant architecture. In S710, the fax server 120 may receive a document from a user. The document may be received with metadata corresponding to a user, device or application that submitted the document, such as a user name, IP address, domain name or other information that allows the user, device, application or tenant to be identified.

In S720, the fax server 120 may determine the tenant with which the document is associated. More specifically, the fax server 120 may determine a corresponding entry for the tenant in a database based on the metadata associated with the received document. For example, fax server 120 may determine that the document was submitted by a user associated with Tenant 001 based on the user name, IP address of the device submitting the document, domain name from which the document was received or to which it was submitted or other information.

In S730, the fax server 120 may apply routing rules, mailbox rules, and/or configuration settings associated the determined tenant. For example, the fax server 120 may store the received fax in an outbox associated with the tenant, may apply a cover sheet specified for the tenant, may send the document to a destination from a fax number associated with the tenant or apply other settings. Again, fax server 120 may apply security rules such that only users associated with a particular tenant may access documents associated with the tenant.

In S740, the steps of FIG. 7 may be repeated as needed or desired, may be performed in other orders, or other steps performed.

The above-described multi-tenant architecture allows a fax server and hence phone lines/hardware resources be shared among multiple tenants. Another advantage of the multi-tenant architecture thus described is the built-in isolation of data below the tenant layer. To illustrate, an administrator in a single-tenant system would have access to the entire population of users served by the system. However, an administrator for one of the tenants in a multi-tenant system could only administer users associated with that particular tenant. Thus, each tenant may separately administer its data on a shared hardware platform.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the embodiments may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The components can be implemented as portions of a program, objects, and modules or according to any suitable software architecture. The components may be distributed across multiple machines.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed:

1. A facsimile server comprising:
   one or more facsimile boards;
   a processor;
   a computer readable media accessible by the processor storing computer instructions executable to perform a method comprising:
   maintaining a set of entity information, wherein the set of entity information is associated with a plurality of tenants that can transmit faxes via the facsimile server, wherein each tenant comprises multiple owners and corresponds to a set of resources;
   maintaining a database configured to store transmitted and received fax documents corresponding to the plurality of tenants;
   receiving a facsimile document at the facsimile server, wherein the facsimile document comprises a document to be transmitted;
   identifying a sending tenant associated with the document based on an identifier associated with the sending tenant that transmitted the document;
   applying, independently of the set of resources of the sending tenant, settings associated with the sending tenant; and
   faxing the document to a receiving tenant based on the applied settings from a fax number allocated to the sending tenant.

2. The facsimile server of claim 1, wherein each of the plurality of tenants has a corresponding fax number.

3. The facsimile server of claim 2, wherein the facsimile document has metadata containing the fax number.

4. The facsimile server of claim 3, wherein the identifying includes identifying the tenant based on the fax number metadata.

5. The facsimile server of claim 1, wherein the identifier associated with each of the tenants is a domain name.

6. The facsimile server of claim 1, wherein at least one of the plurality of tenants is associated with a plurality of users.

7. The facsimile server of claim 1, wherein each of the plurality of tenants shares system resources of the facsimile server.

8. The facsimile server of claim 1, wherein the computer instructions are further executable to perform the steps of:
   identifying a sending owner associated with the facsimile document;
   applying one or more settings when faxing the facsimile document based on the sending owner.

9. A method comprising:
   maintaining a set of entity information, wherein the set of entity information is associated with a plurality of tenants that can transmit faxes via a facsimile server, wherein each tenant comprises multiple owners and corresponds to a set of resources;
   maintaining a database configured to store transmitted and received fax documents corresponding to the plurality of tenants;
   receiving a facsimile document at the facsimile server, wherein the facsimile document comprises a document to be transmitted;
   identifying a sending tenant associated with the document based on an identifier associated with the sending tenant that transmitted the document;
   applying, independently of the set of resources of the sending tenant, settings associated with the sending tenant; and
   faxing the document to a receiving tenant based on the applied settings from a fax number allocated to the sending tenant.

10. The method of claim 9, wherein each of the plurality of tenants has a corresponding fax number.

11. The method of claim 10, wherein the facsimile document has metadata containing the fax number.

12. The method of claim 11, wherein the identifying includes identifying the tenant based on the fax number metadata.

13. The method of claim 9, wherein the identifier is a domain name.

14. The method of claim 13, wherein each of the plurality of tenants has a different domain name.

15. The method of claim 9, wherein at least one of the plurality of tenants is associated with a plurality of users.

16. The method of claim 9, wherein each of the plurality of tenants shares system resources of a facsimile server.

17. The method of claim 9, wherein the method further includes:
   identifying a sending owner associated with the facsimile document;
   applying one or more settings when faxing the facsimile document based on the sending owner.

18. A non-transitory computer program product comprising at least one computer-readable storage medium having computer-readable program code portions stored therein, the computer readable code portions to perform a method comprising:
   maintaining a set of entity information, wherein the set of entity information is associated with a plurality of tenants that can transmit faxes via a facsimile server, wherein each tenant comprises multiple owners and corresponds to a set of resources;
   maintaining a database configured to store transmitted and received fax documents corresponding to the plurality of tenants;
   receiving a facsimile document at the facsimile server, wherein the facsimile document comprises a document to be transmitted;
   identifying a sending tenant associated with the document based on an identifier associated with the sending tenant that transmitted the document;
   applying, independently of the set of resources of the sending tenant, settings associated with the sending tenant; and
   faxing the document to a receiving tenant based on the applied settings from a fax number allocated to the sending tenant.

19. The non-transitory computer program of claim 18, wherein the computer readable code portions are further executable to perform the steps of:
   identifying a sending owner associated with the facsimile document;
   applying one or more settings when faxing the facsimile document based on the sending owner.

* * * * *